Oct. 27, 1925.   1,559,432
O. HOSTAD
FEED RECEPTACLE FOR POULTRY
Filed Dec. 14, 1923   2 Sheets-Sheet 1

Olaf Hostad.
INVENTOR
BY Victor J. Evans.
ATTORNEY
WITNESS:

Oct. 27, 1925. 1,559,432
O. HOSTAD
FEED RECEPTACLE FOR POULTRY
Filed Dec. 14, 1923  2 Sheets-Sheet 2

Olaf Hostad, INVENTOR
BY Victor J. Evans, ATTORNEY

WITNESS:

Patented Oct. 27, 1925.

1,559,432

UNITED STATES PATENT OFFICE.

OLAF HOSTAD, OF SULLIVAN, MICHIGAN.

FEED RECEPTACLE FOR POULTRY.

Application filed December 14, 1923. Serial No. 680,702.

*To all whom it may concern:*

Be it known that I, OLAF HOSTAD, a citizen of the United States, residing at Sullivan, in the county of Muskegon and State of Michigan, have invented new and useful Improvements in Feed Receptacles for Poultry, of which the following is a specification.

The object of this invention is to provide a device adapted to contain grain or mash for feeding poultry, and an article which will serve to keep the food in clean and wholesome condition and easily accessible.

A further object is to provide automatic feeding mechanism.

A still further object is to provide a receptacle covered by a screen and a hood or canopy, and to mount within the receptacle a disk which may be lowered to the bottom when the device is to be filled, and which will be drawn upwardly by a tension spring providing for gradual lifting of the body of food as it is consumed by the chickens.

With the foregoing and other objects in view, the invention consists in the novel construction and arrangement of elements described illustrated and claimed, it being understood that modifications may be made within the scope of the claims without departing from the spirit of the invention.

Figure 1:
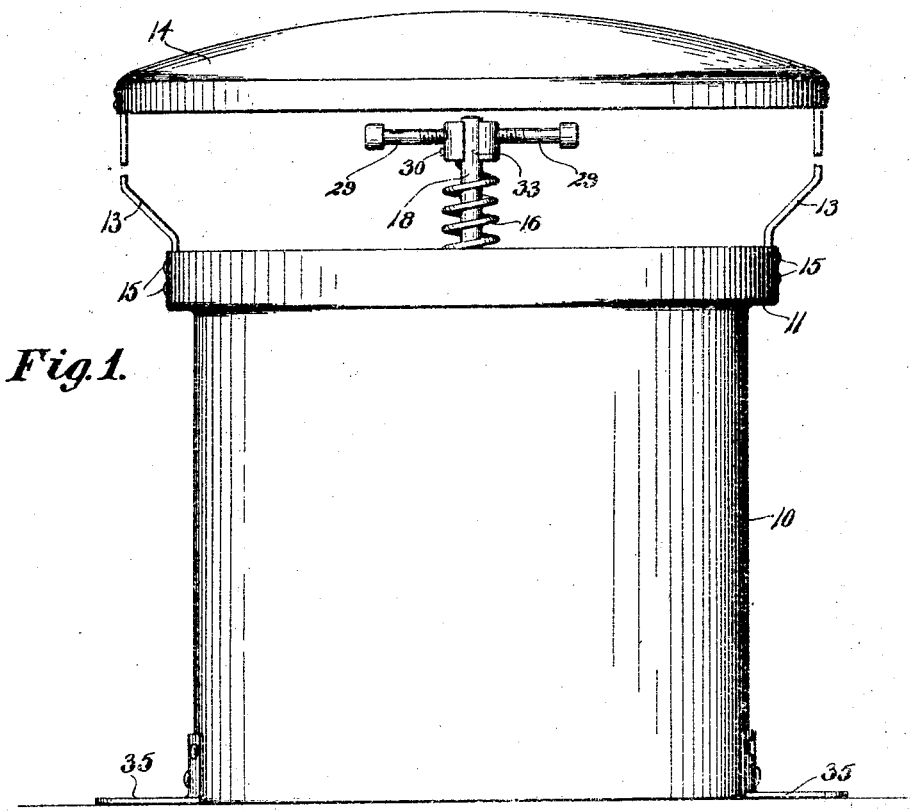
Figure 2:
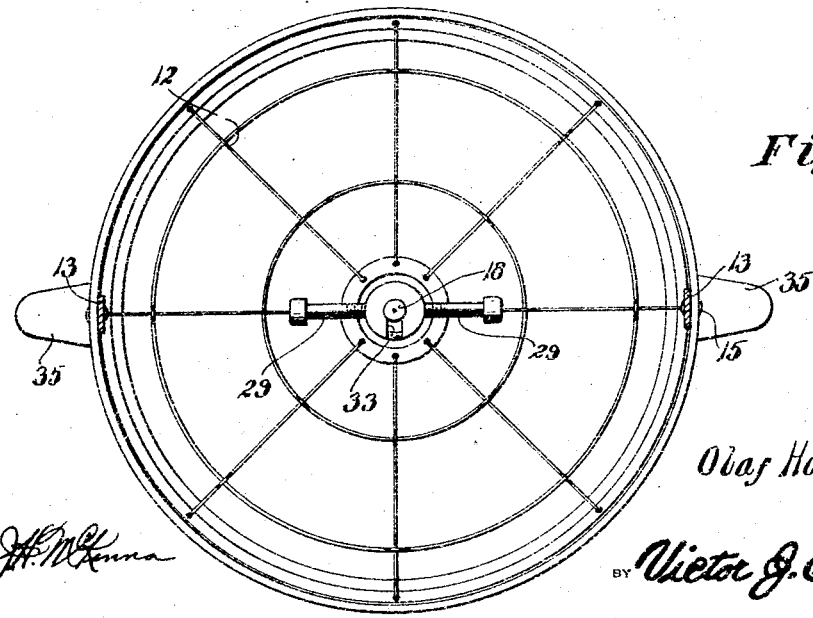
Figure 3:
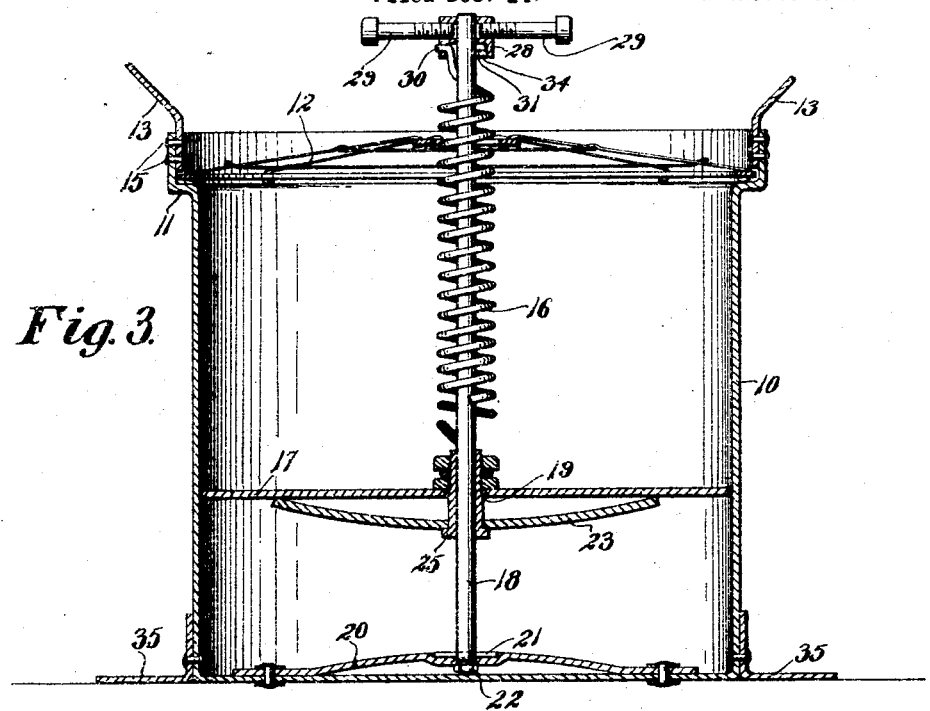
Figures 4, 5:
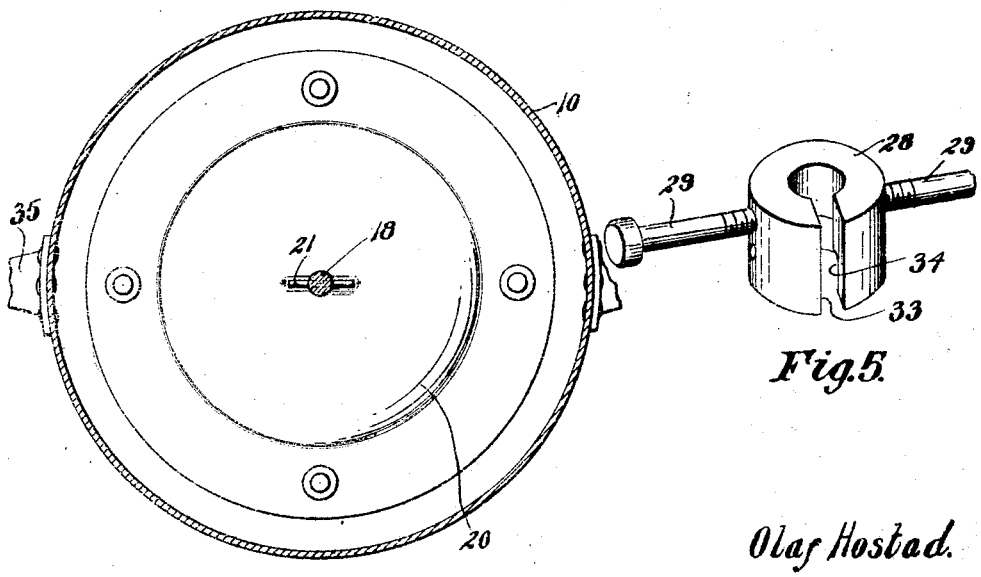

In the drawings, Figure 1 is a view of the device in elevation; Figure 2 is a top plan view; Figure 3 is a vertical section; Figure 4 is a horizontal section, below the disk 17 of Figure 3; Figure 5 is a perspective view of the split collar or sleeve to be mounted at the upper end of the central stem.

The receptacle 10 is provided with an inner annular shoulder 11 near its upper edge, for supporting a screen 12, through which the fowls may have access to the food. Vertically extending arms 13 support a hood or canopy 14, and the lower ends of the arms engage the surface of the screen and retain it in position, arms 13 being retained by securing devices 15.

A disk 17 is vertically movable in the receptacle, and supports the grain or mash, the disk being mounted to permit of automatic feed under spring action—the spring being designated 16.

A spindle 18 is mounted centrally and vertically of receptacle 10, passes loosely through opening 19 of the disk and through the screen. A lower convex plate 20 is riveted to the bottom of the receptacle, and spindle 18 is secured with reference to the plate and the bottom, by elements 21, 22, the latter fitting in a groove or depression in the upper surface of the plate 20.

Plate 23 is also convex on one side, and the convex surfaces of elements 20 and 23 oppose each other,—the weight of disk 17 and the feed being upon elements 20 and 23 constituting evening devices for the load.

A bushing 25 loosely surrounds the spindle, and the disk 17 and plate 23 are movable upwardly on the spindle under the action of tension spring 16 surrounding the spindle and having its lower end secured to the bushing. Elements 25, 17 and 23 move as one.

A sleeve 28 is slotted vertically and surrounds the spindle, being slidable thereon. This sleeve is provided with laterally extending arms 29, and with an aperture receiving the offset end 30 of the spring. A pin 31 fixed in the upper end of the spindle supports the sleeve when the spring is placed under tension and the sleeve is drawn upwardly. As the sleeve comes toward the top it is moved to position permitting the pin 31 to pass through slot 33, and the sleeve is then partly rotated to prevent reverse movement of the sleeve in a vertical direction. When the sleeve is thus rotated, the pin 31 enters the lower annular groove 34 of the sleeve.

When the device is to be filled, the sleeve is partly rotated to permit of release with reference to pin 31, and the disk, spring, and sleeve allowed to drop to their lower position. The sleeve is then raised and locked, the body of feed being interposed between the disk 17 and the screen, and the spring being under tension. The screen is of such mesh that the automatic feed upwardly, under the action of the spring, takes place when the food is removed by the chickens, and depends upon the amount thus consumed.

The foot members 35 projecting outwardly from the bottom of the receptacle, permit the individual filling the device to hold the receptacle down with his feet while using his hands on the arms extending laterally from the sleeve, for raising the sleeve and placing the spring under tension.

What I claim is:

1. In a device of the class described, a receptacle, a spindle mounted centrally and vertically thereof, a screen mounted in the receptacle, a disk therein slidable on the spindle, a spring connected with the disk, a slotted sleeve on the spindle, and a pin fixed in the upper end of the spindle for locking the sleeve against sliding movement under the action of the spring, but permitting sliding movement when the sleeve is rotated to permit the slotted portion thereof to pass the pin, the sleeve having an inner annular recess and having an aperture extending outwardly from the recessed portion, for receiving the end of the spring.

2. In a device of the class described, a receptacle, a spindle mounted centrally and vertically thereof, means for limiting the upward movement of a body of food on the disk, a tension spring for producing such upward movement, a bushing slidable on the spindle and connected with the disk, and elements secured respectively to the disk and bottom of the receptacle for evening the movement of the disk and the body of food thereon, one of said elements being partly retained by the bushing.

In testimony whereof I affix my signature.

OLAF HOSTAD.